(12) United States Patent
Musacchio et al.

(10) Patent No.: US 11,162,517 B2
(45) Date of Patent: **\*Nov. 2, 2021**

(54) VARIABLE OUTPUT LIQUID CHROMATOGRAPHY PUMP DRIVE

(71) Applicant: Waters Technologies Corporation, Milford, MA (US)

(72) Inventors: Jeffrey Musacchio, Sharon, MA (US); Joseph Michienzi, Plainville, MA (US)

(73) Assignee: WATERS TECHNOLOGIES CORPORATION, Milford, MA (US)

( \* ) Notice: Subject to any disclaimer, the term of this patent is extended or adjusted under 35 U.S.C. 154(b) by 63 days.

This patent is subject to a terminal disclaimer.

(21) Appl. No.: 16/573,311

(22) Filed: Sep. 17, 2019

(65) Prior Publication Data

US 2020/0088220 A1 Mar. 19, 2020

Related U.S. Application Data

(60) Provisional application No. 62/732,625, filed on Sep. 18, 2018.

(51) Int. Cl.
*F16H 3/54* (2006.01)
*F15B 15/14* (2006.01)
(Continued)

(52) U.S. Cl.
CPC ............ *F15B 15/1409* (2013.01); *F15B 1/04* (2013.01); *F15B 15/18* (2013.01); *F16H 3/02* (2013.01); *F16H 3/44* (2013.01); *G01N 30/02* (2013.01); *F16H 3/54* (2013.01); *F16H 3/64* (2013.01); *F16H 15/56* (2013.01);
(Continued)

(58) Field of Classification Search
CPC .... F16H 2200/2007; F16H 2200/2033; G01N 30/02; G01N 2030/027; F25B 15/18
See application file for complete search history.

(56) References Cited

U.S. PATENT DOCUMENTS 3,922,115 A 11/1975 Coe et al.
5,935,035 A 8/1999 Schmidt
(Continued)

FOREIGN PATENT DOCUMENTS

EP 1437509 A2 7/2004
WO 2010139359 A1 12/2010

OTHER PUBLICATIONS

International Search Report and Written Opinion in related international patent application No. PCT/US19/051483, dated Jan. 8, 2020; 16 pages.

(Continued)

*Primary Examiner* — Stacey A Fluhart
(74) *Attorney, Agent, or Firm* — Schmeiser, Olsen & Watts LLP; Victor J. Baranowski

(57) ABSTRACT

Disclosed is a liquid chromatography solvent pump including a motor, a first piston, a second piston, and a variable output drive system coupling the motor to at least one of the first piston and the second piston. The variable output drive system includes a gearbox configured to provide a non-equal ratio between an input from the motor and an output delivered to at least one of the first piston and the second piston. The first piston and the second piston are configured to deliver a flow of solvent in a liquid chromatography system.

20 Claims, 13 Drawing Sheets

(51) Int. Cl.
*F15B 1/04* (2006.01)
*F15B 15/18* (2006.01)
*F16H 3/02* (2006.01)
*G01N 30/02* (2006.01)
*F16H 3/44* (2006.01)
*G01N 30/32* (2006.01)
*F16H 3/64* (2006.01)
*F16H 15/56* (2006.01)

(52) U.S. Cl.
CPC ............. *F16H 2200/2005* (2013.01); *F16H 2200/2007* (2013.01); *F16H 2200/2033* (2013.01); *G01N 2030/027* (2013.01); *G01N 2030/326* (2013.01)

(56) References Cited

U.S. PATENT DOCUMENTS

| | | | |
|---|---|---|---|
| 9,316,216 B1* | 4/2016 | Cook | B05B 12/1445 |
| 2005/0095145 A1* | 5/2005 | Hiraku | F04B 49/06 |
| | | | 417/254 |
| 2005/0214130 A1 | 9/2005 | Yang | |
| 2010/0029428 A1 | 2/2010 | Abe et al. | |
| 2012/0285558 A1 | 11/2012 | Witt et al. | |
| 2013/0330209 A1* | 12/2013 | Joudrey | F04B 53/16 |
| | | | 417/54 |
| 2017/0211662 A1* | 7/2017 | Okamoto | F16H 3/663 |
| 2018/0149628 A1 | 5/2018 | Yamakawa | |
| 2020/0088220 A1 | 3/2020 | Musacchio et al. | |
| 2020/0088221 A1* | 3/2020 | Musacchio | F16H 37/0846 |

OTHER PUBLICATIONS

International Search Report and Written Opinion in related international patent application No. PCT/US19/051507, dated Jan. 8, 2020; 17 pages.
Wikipedia: "Wikipedia: Transmission (mechanics)," Sep. 10, 2018, XP055653431, Retrieved from the Internet: URL:https://en.wikipedia.org/w/index.php?title=Transmission_(mechanics)&oldid=858845301 [retrieved on Dec. 17, 2019].
Non-Final Office Action in U.S. Appl. No. 16/573,439 dated Jan. 22, 2021.
Non-Final Office Action in U.S. Appl. No. 16/573,439 dated Jun. 24, 2021.
International Preliminary Report on Patentability in PCT/US2019/051483 dated Apr. 1, 2021.
International Preliminary Report on Patentability in PCT/US2019/051507 dated Apr. 1, 2021.

* cited by examiner

VARIABLE OUTPUT LIQUID CHROMATOGRAPHY PUMP DRIVE

RELATED APPLICATIONS

This application is a non-provisional patent application claiming priority to U.S. Provisional Patent Application No. 62/732,625, filed Sep. 18, 2018, entitled "Variable Output Liquid Chromatography Pump Drive," which is incorporated herein by reference.

FIELD OF THE INVENTION

The invention relates generally to liquid chromatography systems. More particularly, the invention relates to liquid chromatography pump drive systems, and associated methods of use thereof.

BACKGROUND

Chromatography is a set of techniques for separating a mixture into its constituents. In a liquid chromatography system, one or more pumps take in and delivers a mixture of liquid solvents to a sample manager, where an injected sample awaits its arrival. Liquid chromatography pump systems require drive systems for diving the pumps and injecting solvents and/or samples. Existing drive systems for liquid chromatography systems are direct drive systems—i.e. coupled directly to a rotary to linear motion converter, with or without a gearbox. Current drive systems are designed to handle very specific flow rates and pressures. These drive systems are quickly de-rated as users operate outside the ideal range (i.e. if the flow rate is increased outside the ideal range, the pressure may decrease). For example, current drive systems are outfitted with large motors to handle high end speeds and loads. However, these large motor systems suffer in flow resolution when they are run at lower speeds. Because motors run more precisely and accurately within the designed ranges, when a motor is asked to perform outside its ideal range, the precision and resolution of the flow rate and pressure output will suffer.

Thus, improved liquid chromatography systems including pump drive systems, and associated methods of use thereof, would be well received in the art.

SUMMARY

In one embodiment, a liquid chromatography solvent pump comprises: a motor; a first piston; a second piston; a variable output drive system coupling the motor to at least one of the first piston and the second piston, the variable output drive system comprising a gearbox configured to provide a non-equal ratio between an input from the motor and an output delivered to at least one of the first piston and the second piston, wherein the first piston and the second piston are configured to deliver a flow of solvent in a liquid chromatography system.

Additionally or alternatively, the first piston is a primary piston and the second piston is an accumulator piston.

Additionally or alternatively, the gearbox includes a stage of gears comprising: a sun gear; a plurality of planet gears meshed with and surrounding the sun gear and configured to revolve around the sun gear; and a ring gear meshed with and surrounding the plurality of planet gears, wherein the plurality of planet gears are configured to revolve within the ring gear.

Additionally or alternatively, the liquid chromatography solvent pump includes a carrier connecting the plurality of planet gears, wherein the motor provides an input to the sun gear, wherein the carrier comprises an output from the plurality of planet gears.

Additionally or alternatively, the carrier provides the output to at least one of the first piston and the second piston.

Additionally or alternatively, the gearbox further comprises: a fixed housing configured to engage with the ring gear to prevent rotation of the ring gear, wherein the ring gear is configured to disengage from the fixed housing to provide for free rotation of the ring gear about the fixed housing.

Additionally or alternatively, the liquid chromatography solvent pump includes a second stage of gears, the second stage of gears comprising: a second sun gear; a second plurality of planet gears meshed with and surrounding the second sun gear and configured to revolve around the second sun gear; a second ring gear meshed with and surrounding the second plurality of planet gears, wherein the second plurality of planet gears are configured to revolve within the second ring gear; and a second carrier connecting the second plurality of planet gears, wherein the carrier provides an input to the second sun gear; and wherein the second carrier provides an output to at least one of the first piston, the second piston, and a third sun gear of a third stage of gears.

Additionally or alternatively, the liquid chromatography solvent pump includes a fixed housing configured to engage with the ring gear and the second ring gear to selectively and independently prevent rotation of the ring gear and the second ring gear, wherein the ring gear and the second ring gear are each configured to selectively and independently disengage from the fixed housing to provide for selective free rotation of the ring gear and the second ring gear about the fixed housing.

Additionally or alternatively, the variable output drive system, the first piston and the second piston are configured to deliver the flow at a rate and accuracy that enables use of the liquid chromatography solvent pump in both analytical and preparative liquid chromatography systems.

Additionally or alternatively, the gearbox is configured to provide an equal ratio between an input from the motor and an output delivered to at least one of the first piston and the second piston, and wherein the equal ratio and the non-equal ratio are selectable by an operator of the liquid chromatography solvent pump.

In another embodiment, a method of pumping solvent in a liquid chromatography system, the method comprises: providing a liquid chromatography solvent pump comprising a variable output drive system coupling a motor and at least one piston, the variable output drive system comprising a gearbox configured to provide a non-equal ratio between an input from the motor and an output delivered to the at least one piston; and varying the output from an equal ratio to the non-equal ratio between the input from the motor and the output delivered to the at least one piston.

Additionally or alternatively, the method includes delivering a flow of solvent in a liquid chromatography system by the at least one piston with a flow rate determined at least partially by the output.

Additionally or alternatively, the method includes using the liquid chromatography solvent pump in an analytical liquid chromatography system; and using the liquid chromatography solvent pump in a preparative liquid chromatography system.

Additionally or alternatively, the gearbox includes a stage of gears comprising: a sun gear; a plurality of planet gears meshed with and surrounding the sun gear and configured to revolve around the sun gear; a ring gear meshed with and surrounding the plurality of planet gears, wherein the plurality of planet gears are configured to revolve within the ring gear; a carrier connecting the plurality of planet gears; and a fixed housing, the method further comprising: providing, by the motor, an input to the sun gear; and providing, by the carrier, an output by the plurality of planet gears.

Additionally or alternatively, the method includes engaging the ring gear with the fixed housing to prevent rotation of the ring gear such that a first ratio exists between the input from the motor and the output delivered to the at least one piston.

Additionally or alternatively, the method includes disengaging the ring gear with the fixed housing to provide for free rotation of the ring gear about the fixed housing such that a second ratio exists between the input from the motor and the output delivered to the at least one piston.

Additionally or alternatively, the gearbox further includes a second stage of gears, the second stage of gears comprising: a second sun gear; a second plurality of planet gears meshed with and surrounding the second sun gear and configured to revolve around the second sun gear; a second ring gear meshed with and surrounding the second plurality of planet gears, wherein the second plurality of planet gears are configured to revolve within the second ring gear; and a second carrier connecting the second plurality of planet gears, the method further comprising: providing, by the carrier, an input to the second sun gear; and providing, by the second carrier, an output to at least one of the first piston, the second piston, and a third sun gear of a third stage of gears.

Additionally or alternatively, the method includes selectively and independently engaging, with the fixed housing, the ring gear and the second ring gear to selectively and independently prevent rotation of the ring gear and the second ring gear.

Additionally or alternatively, the method includes selectively and independently disengaging, with the fixed housing, the ring gear and the second ring gear to selectively and independently allow free rotation of the ring gear and the second ring gear about the fixed housing.

In another embodiment, a liquid chromatography system comprises: a solvent delivery system, including: a pump comprising: a motor; a first piston; a second piston; and a variable output drive system coupling the motor to at least one of the first piston and the second piston, the variable output drive system comprising a gearbox configured to provide a non-equal ratio between an input from the motor and an output delivered to at least one of the first piston and the second piston, wherein the first piston and the second piston are configured to deliver a flow of solvent in a liquid chromatography system; a sample delivery system in fluidic communication with solvent delivery system; a liquid chromatography column located downstream from the solvent delivery system and the sample delivery system; and a detector located downstream from the liquid chromatography column.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

The present invention relates to liquid chromatography pump drive systems, and methods of use thereof. Disclosed herein are pump drive systems including a motor, or other device that creates a mechanical rotation on a drive system. The liquid chromatography pump drive systems described herein include a gearbox that provides for various input-to-output ratios to be achieved between the rotation of the drive system and the output that is provided to the pump(s). The gearboxes described herein include one or more planetary gear systems configured to create various input-to-output conversion ratios. A housing or other mechanism may act as a clutch or base to selectively prevent rotation of one or more components of the planetary gear system. One or more stages of planetary gear systems are contemplated to achieve varying possible input-to-output ratios. As a result of the various outputs achieved by the drive systems, embodiments of the invention described herein may allow for a single pump and pump drive system to accommodate various liquid chromatography systems utilizing various column dimensions. Further, embodiments of the invention described herein may allow for the same pump and pump drive system to accommodate both preparative and analytical chromatography techniques. The pump drive systems described herein allow for high accuracy at various drastically disparate flow rates.

Figure 1:
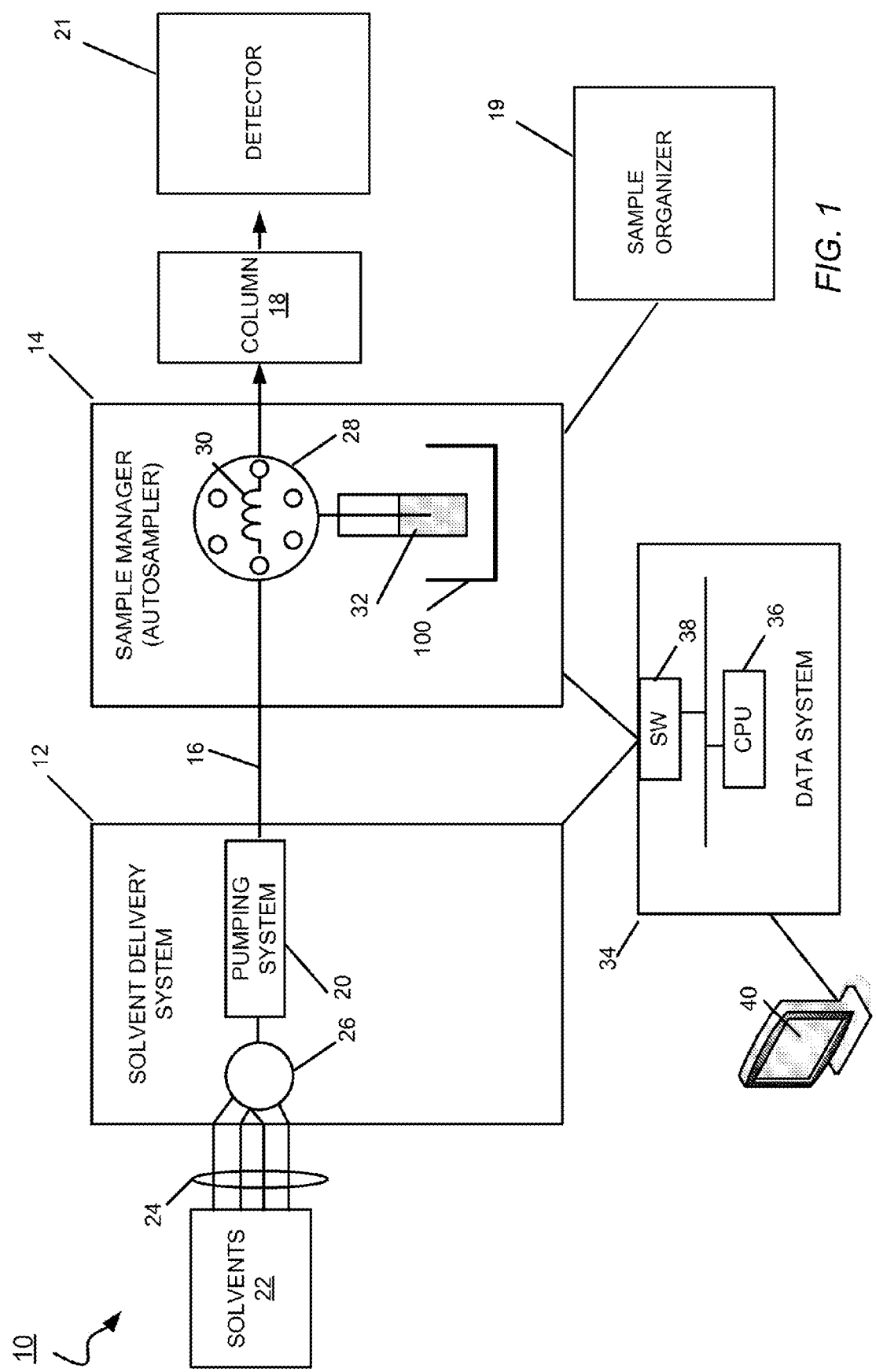
FIG. 1 depicts a schematic view of a liquid chromatography system including a pumping system in accordance with one embodiment.

FIG. 1 depicts a schematic view of a liquid chromatography system that includes a solvent delivery system including the solvent reservoir filter of FIG. 1, in accordance with one embodiment. FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18 and in mechanical communication with a sample organizer 19. The sample organizer 19 may be configured to store samples and provide stored samples to the sample manager 14 using an automated, robotic, or other mechanical moving process. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In the embodiment shown, the pumping system 20 is embodied by a low-pressure mixing gradient pumping system. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient). In other embodiments, the liquid chromatography system 10 may be a high-pressure mixing system.

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. The sample manager 14 may operate in one of two states: a load state and an injection state. In the load state, the position of the injector valve 28 is such that the sample manager loads the sample 32 into the sample loop 30. The sample 32 is drawn from a vial contained by a sample vial carrier or any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 may further include a data system 34 that is in signal communication with the solvent delivery system 12, the sample manager 14 and/or the sample organizer 19. The data system 34 may include a processor 36 and a switch 38 (e.g. an Ethernet switch) for handling signal communication between the solvent delivery system 12, the sample manager 14, and the sample organizer 19, and otherwise controlling these components of the liquid chromatography system 10. A host computing system 40 is in communication with the data system 34 by which a technician can download various parameters and profiles (e.g., an intake velocity profile) to the data system 34.

Figure 2:
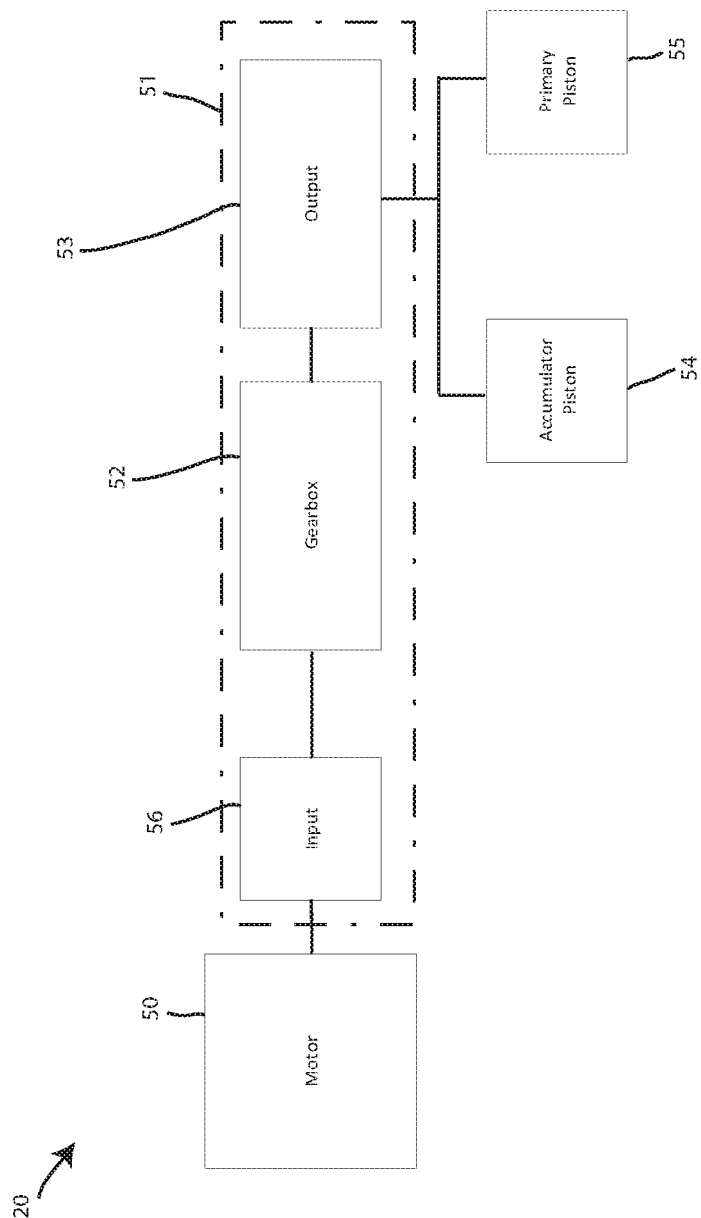
FIG. 2 depicts a schematic view of the pumping system of FIG. 1 in accordance with one embodiment.

FIG. 2 depicts a schematic view of the pumping system 20 in accordance with one embodiment. While the pumping system 20 of FIG. 2 is shown included in the liquid chromatography system 10 of FIG. 1, the pumping system 20 may also be applicable to any liquid chromatography system, such as High-Performance Liquid Chromatography systems (HPLC), Ultra Performance Liquid Chromatography systems (UPLC), Ultra High Performance Liquid Chromatography systems (UHPLC) or the like. The pumping system 20 may be applicable to both analytical and preparative liquid chromatography systems. Due to the advantages of the structure and/or methodology described herein, the pumping system 20 may be capable of operating with the precision, resolutions, flow rates, and/or pressures necessary under various types of liquid chromatography systems. Thus, it is contemplated that, because of the varying output ratios, the same pumping system incorporating some or all aspects of the present disclosure may be configured to operate with both preparative and analytical liquid chromatography systems. It is further contemplated that the same pumping system incorporating some or all aspects of the present disclosure may be configured to operate with analytical liquid chromatography systems with 2000 microliter per minute flowrates, or for smaller nano-flow or micro-flow columns having much lower flow rates of less than 100 microliters per minute.

The pumping system 20 shown includes a motor 50, a variable output drive system 51 that includes an input 56 that connected to a gearbox 52. The gearbox 52 is connected to an output 53 that is connected to an accumulator piston 54 and a primary piston 55. While not shown in FIG. 2, the motor 50 may also be encompassed by what is considered the features of the variable output drive system 51. Further, the output 53 of the gearbox 52, while shown connected to both the accumulator piston 54 and the primary piston 55, may also be connected to only a single one or the other of the accumulator piston 54 or the primary piston 55. For example, the gearbox 52 may provide an output only to the accumulator piston 54 while another motor (not shown) may provide power to the primary piston. The other motor may or may not include a gearbox similar or the same as the gearbox 52. It is therefore contemplated that a single gearbox 52 may be provided for providing varying output ratios to one or the other of the accumulator piston 54 and the primary piston 55.

The variable output drive system 51 may be configured to provide a non-equal ratio between the input 56 and the output 53. The variable output drive system 51 may provide the output 53 with a plurality of output ratios relative to the input 56 delivered by the motor 50. The variable output drive system 51 may be configured to first deliver a 1:1 ratio relative to the input 56 delivered by the motor 50. For example, if the motor 50 delivers the input 56 at 200 rpm the variable output drive system 51 may include a setting whereby the output 53 is also delivered at 200 rpm, providing a 1:1 output ratio. The variable output drive system 51 may also be configured with one or more additional settings whereby the input 56 is delivered by the motor 50 at a less than or greater than 1:1 output ratio. For example, the variable output drive system 51 may be configurable such that the input 56 is delivered by the motor 50 at 200 rpm and the output 53 is increased or decreased by the gearbox to a greater than or less than 200 rpm output. For example, the output ratio may be 1:2 whereby the input 56 of 200 rpm delivered by the motor is converted to a 400 rpm output 53 by the gearbox 52. The output ratio may be 1:0.5 whereby the input 56 of 200 rpm delivered by the motor is converted to a 100 rpm output 53 by the gearbox 52. In some embodiments, the gearbox 52 may be configured to provide a plurality of different output ratios other than or in addition to the 1:1 output ratio. In still other embodiments, the gearbox 52 may provide two settings: a 1:1 output ratio and a second ratio that is greater than or less than the 1:1 output ratio.

In one embodiment, the gearbox 52 may be configured to provide three additional output ratios in addition to the 1:1 ratio: 1:9, 1:45 and 1:405. These output ratios may correspond to operation of the gearbox 52 in liquid chromatography systems having a 2.1 millimeter diameter column, a 1 millimeter diameter column, and a 0.3 millimeter diameter column, respectively. The gearbox 52 may provide the ability of the pumping system 20 to be operable on each of these three column sizes without changing the motor 50. In another embodiment, the gearbox 52 may be configured to provide four additional output ratios in addition to the 1:1 ratio: 1:9, 1:45, 1:405, and 1:1080. These output ratios may correspond to operation of the gearbox 52 in liquid chromatography systems having a 2.1 millimeter diameter column, a 1 millimeter diameter column, a 0.3 mm diameter column, and a 0.15 mm diameter column, respectively. It should be understood that these are exemplary ratios, and gearboxes contemplated herein may provide for any appropriate ratios that would increase the functionality of the pump systems within which they operate. The gearbox 52 may provide the ability of the pumping system 20 to be operable on more than one of these four column sizes without changing the motor 50. In various other embodiments, any output ratio may be provided by varying the number of teeth in each of the ring gear 61, planetary gear system 62, and sun gear 63.

With the gearbox 52, embodiments of the pumping system 20 may be configured to deliver a flow rate of fluid equal to or greater than 1500 microliter per minute while also being configured to deliver a flow rate of fluid equal to or less than 1 microliter per minute in a highly accurate manner. In other embodiments, the pumping system 20 may be configured to deliver a flow rate of fluid equal to or greater than 750 microliters per minute while also being configured to deliver a flow rate of fluid equal to or less than 5 microliters per minute in a highly accurate manner. In still other embodiments, the pumping system 20 may be configured to deliver a flow rate of fluid equal to or greater than 1000 microliters per minute while also being configured to deliver a flow rate of fluid equal to or less than 2 microliters per minute in a highly accurate manner. These examples are meant to be exemplary and various other working ranges are contemplated.

In one exemplary embodiment where the gearbox 52 provides an input-to-output ratio of 1:9, the max flow provided may be 2500 microliters per minute. At this operational flow rate, the resolution may be 13 nanoliters per motorstep. In another exemplary embodiment where the gearbox provides an input-to-output ratio of 1:1080, the max flow may be 20,000 microliters per minute. At this operational flow rate, the resolution may be 0.1 nanoliters per motorstep. It should be understood that these maximum flow rates and resolutions are exemplary and that the principles of the invention may be applied to create liquid chromatography pump systems capable of providing accurate flows of various rates and resolutions. In various embodiments, the minimum flow rate may be 0.1% of the maximum flow rate. In other embodiments, the minimum flow rate may be 1% of the maximum flow rate. In still other embodiments, the minimum flow rate may be 10% of the maximum flow rate. In one example, the maximum revolutions per second of the motor 50 may be 100 or more and the minimum may be less than one. For example, the maximum revolutions per second of the motor may be 95 and the minimum may be 0.15. The motor 50 may be configured to be maintained within this working range at the various input-to-output ratios and flow rates provided by the pumping system 20.

The output 53 is shown extending from the gearbox and is configured to convert rotational motion from the motor 50 and gearbox 52 into linear motion used to drive the accumulator 54 and primary pistons 55. In one embodiment, the output 53 may be rotary motion to linear via a ball screw. In another embodiment, the output 53 may be a shaft with a plurality of driving cams attached thereto which integrate with the accumulator piston 54 and primary piston 55 to provide linear motion in the pistons 54, 55. The output 53 may be configured to allow for the pistons 54, 55 to operate in tandem: when one piston fills, the other delivers. The output 53 and piston 54, 55 configuration may be capable of providing a constant flow and pressure output from the pumping system 20.

The primary piston 55 and the accumulator piston 54 may be configured to pump solvent fluid into the liquid chromatography system 10. The primary piston 55 and the accumulator piston 54 may be configured to operate in tandem and may both be driven by the output 53 from the gearbox 52. The primary piston 55 may be configured to deliver flow at the desired flow rate during the compression stroke of the primary piston 55. During the intake stroke of the primary piston 55, the accumulator piston 54 may deliver the compression stroke at double the desired flow rate. During the compression stroke of the accumulator piston 54, half of the flow delivered by the accumulator piston 54 may be provided to the chamber of the primary piston while the other half maintains the desired flow rate. This may be configured to maintain a constant desired flow rate and pressure by the pumping system 20.

While the accumulator piston 54 and primary piston 55 may be positioned in series along a fluid path, the gearbox 52 described herein may be applicable to two piston pumps where pistons are placed in parallel. Still further, embodiments and aspects of the gearbox 52 described herein may be applicable to various other fluid pump designs, both in and out of the field of liquid chromatography, along with liquid chromatography sample syringes.

Figure 3A:
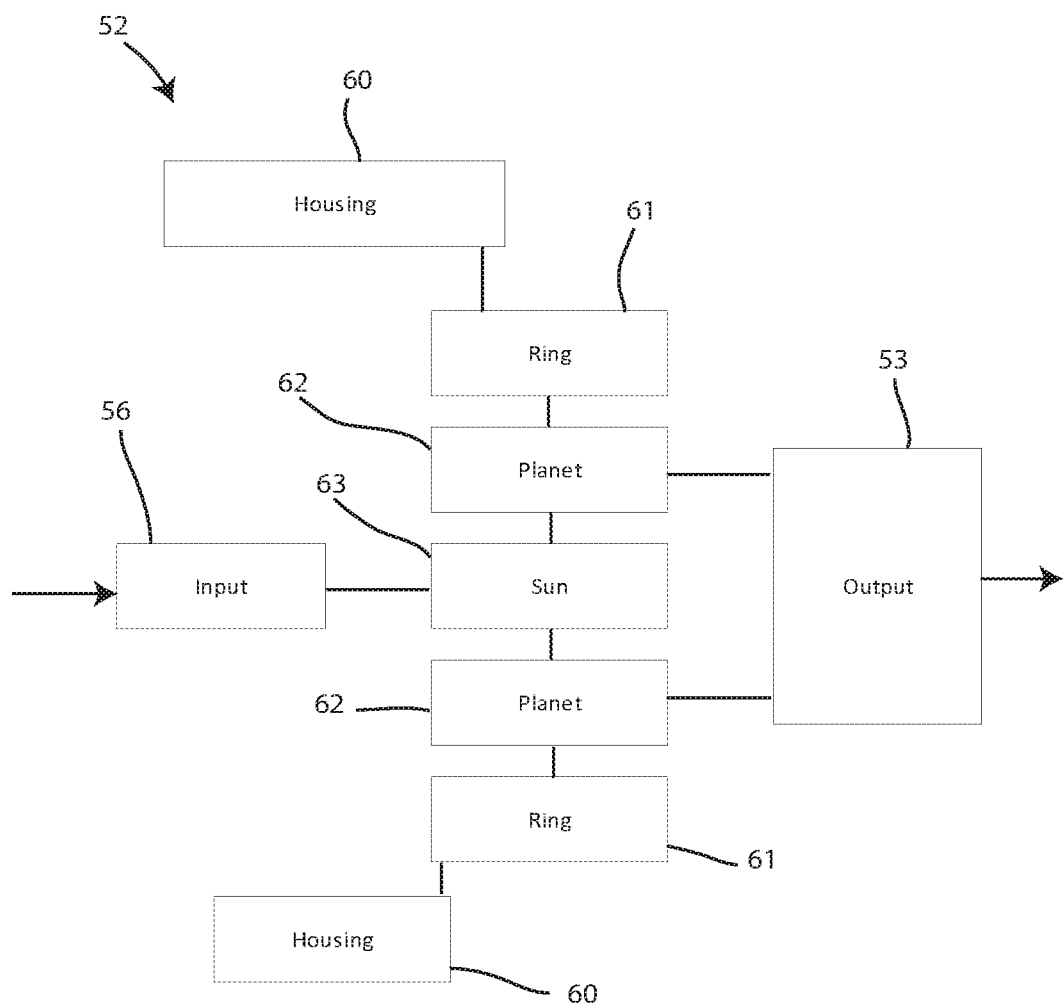
FIG. 3A depicts a first schematic view of a gearbox of the pumping system of FIGS. 1 and 2 in accordance with one embodiment.

FIG. 3A depicts a first schematic view of the gearbox 52 of the pumping system 20 in accordance with one embodiment. The gearbox 52 may include a housing 60 surrounding a ring gear 61, a planet gear system 62, and a sun gear 63. The planet gear system 62 includes a plurality of separate planet gears. The planet gear system 62 is meshed with and surrounding the sun gear 63. The planet gear system 62 is configured to rotate about the sun gear 63. The ring gear 61 may be meshed with and surrounding the planet gear system 62 such that the planet gear system 62 is configured to rotate about the ring gear 62. The ring gear is meshed with or otherwise attached to the housing 60. The housing 60 is a fixed housing, preventing movement of the ring gear 62 when the ring gear 62 is meshed with the housing 60.

In the embodiment shown, the input 56 is connected directly to the sun gear 63 to drive or rotate the sun gear 63. The ring gear 62 is fixed to the housing 60 and therefore does not rotate. In this embodiment, the planet gear system 62 rotates about the sun gear 63 at a rate that depends on the number of teeth of the sun gear 63 and the ring gear 62 and the rotational speed of the sun gear 63 provided by the input 56 from the motor 50 according to the following formula:

$$\Omega_{planet} = \Omega_{sun}(n_{sun})/(n_{ring}+n_{sun})$$

where $\Omega$ is rotational velocity and n is the number of teeth. Thus, the output velocity of the planet gear system 62 may be different than the input velocity of the sun. When the input 56 is directly connected to the sun gear 63 and the output 53 is connected to the planetary gear system 62 with the ring gear 62 being fixed, the torque of the gearbox 52 may be high but the output speed may be low compared to other embodiments described hereinbelow and shown in FIGS. 8A-8E. This embodiment is particularly advantageous in providing high precision resolution for the output flow.

Figure 3B:
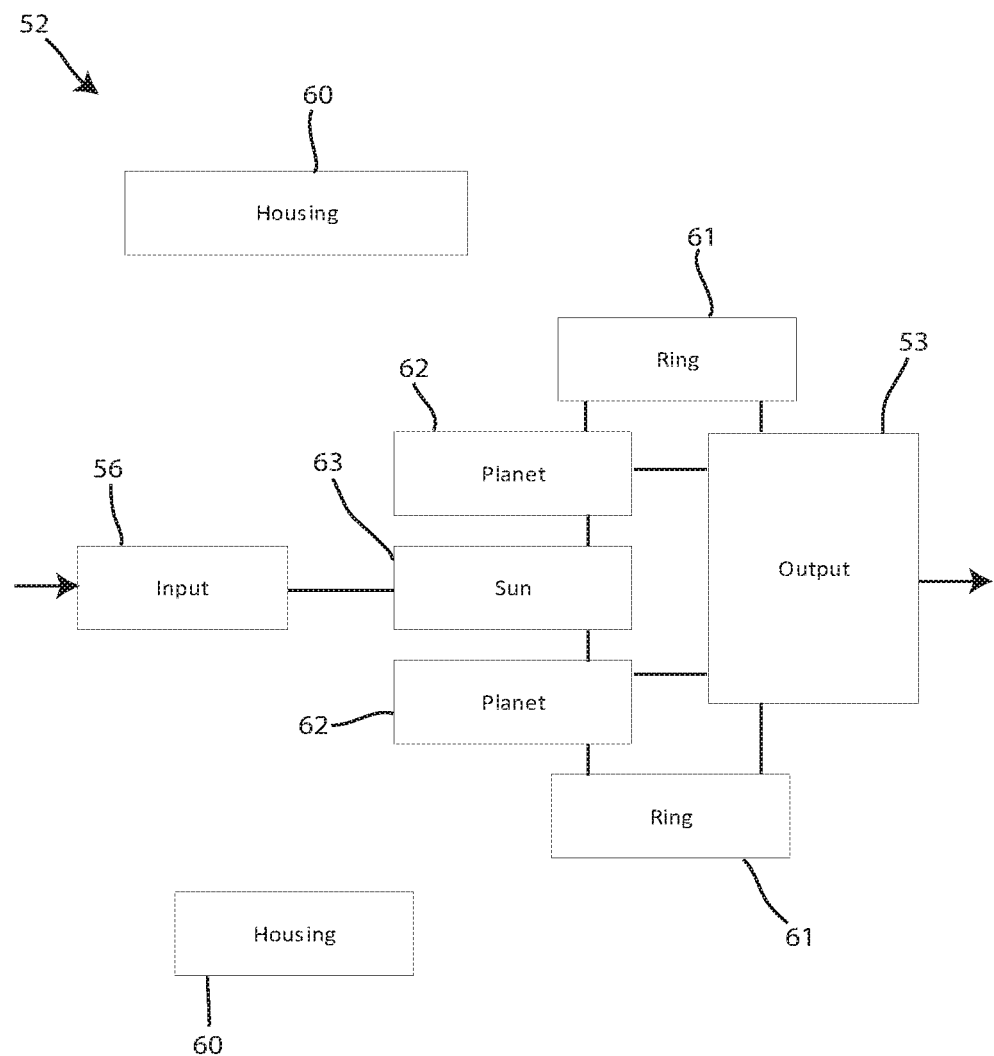
FIG. 3B depicts a second schematic view of the gearbox of FIG. 3A in accordance with one embodiment.

FIG. 3B depicts a second schematic view of the gearbox 52 in accordance with one embodiment. FIG. 3B is differentiated from the schematic view of FIG. 3A in that the ring gear 62 has been detached from the housing 60 and allowed to freely rotate. In this embodiment, the entirety of the ring gear 61, the planet gear system 62 and the sun gear 63 may be affixed together and rotate at the rate of the input 56. Thus, the rotational velocity of the output 53 will equal the rotational velocity of the input 56 creating a 1:1 input to output ratio. As shown by FIGS. 3A and 3B, the housing 60 is fixed and is configured to prevent rotation of the ring gear 61 when the ring gear 61 and the housing 60 are meshed. The ring gear 61 is configured to disengage from the housing 60 to provide for free rotation of the ring gear 61 about the housing 60, which remains fixed.

As shown in FIGS. 3A and 3B, the output 53 is attached to the planet gear system 62. The output 53 may be any carrier interface that provides rotational motion. For example, the output 53 may be a carrier that attaches to, or otherwise integrates with, each of the plurality of planet gears of the planet gear system 62. In the case that the planet gear system 62 includes three planet gears, the output 53 may be a carrier fixture that includes three extending prongs fitting each into a center of each of the three planet gears. The base of the fixture may be configured to attach to the cam shaft of the output 53. Whatever the embodiment, the output 53 may take the rotation of the planet gears about the sun gear 63 and provide this rotational motion in a manner that may be converted into the linear motion of the pistons 54, 55.

Figure 4:
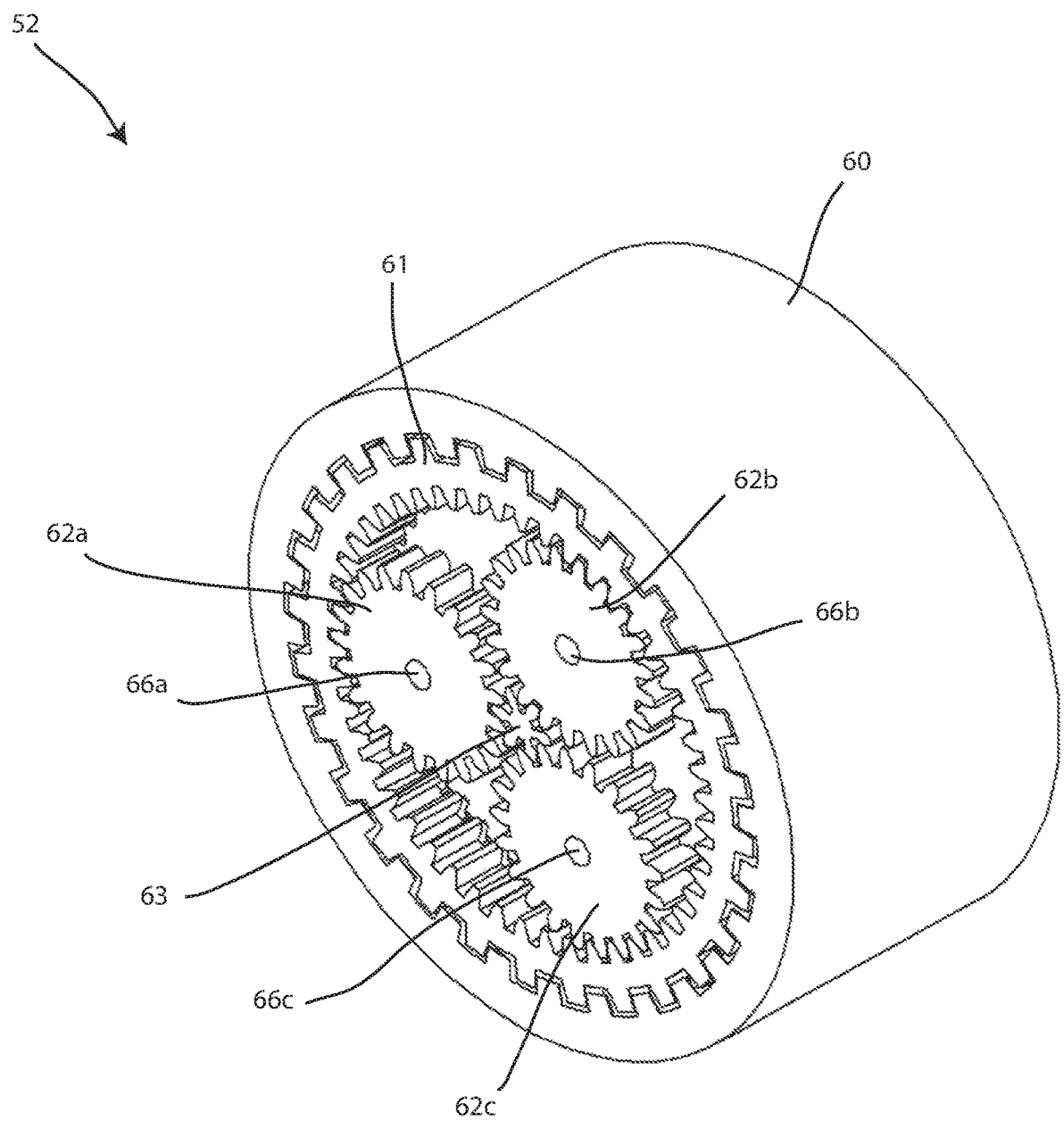
FIG. 4 depicts a perspective view of the gearbox of FIGS. 3A and 3B in accordance with one embodiment.

FIG. 4 depicts a perspective view of the gearbox 52 in accordance with one embodiment. FIG. 4 shows a position of the gearbox 52 that corresponds to the schematic shown in FIG. 3A where the ring gear 61 is meshed with and fixed to the housing 60. Thus, the housing 60 may also include inner teeth configured to mesh with the teeth of the ring gear 61. In one embodiment, the inner teeth of the housing 60 are configured to retract into the body of the housing 60 to allow the ring gear 61 to freely rotate about the housing 60. In another embodiment, the housing 60 and the ring gear 61 may move axially relative to each other to free to ring gear 61 from the housing 60.

As shown in FIG. 4, the planet gear system 62 includes three planet gears, a first planet gear 62a, a second planet gear 62b, and a third planet gear 62c. The planet gears 62a, 62b, 62c each include a corresponding center opening 66a, 66b, 66c which may receive a prong of the carrier or output 53. As shown, the sun gear 63 includes only six teeth while the ring gear includes 48 teeth. The planet gears each include 21 teeth. This embodiment is exemplary, and more or less teeth for any of the sun gear 63, the planet gears 62a, 62b, 62c and ring gear 61 are contemplated. Further, more or less than three planet gears are contemplated in other embodiments.

Figure 5:
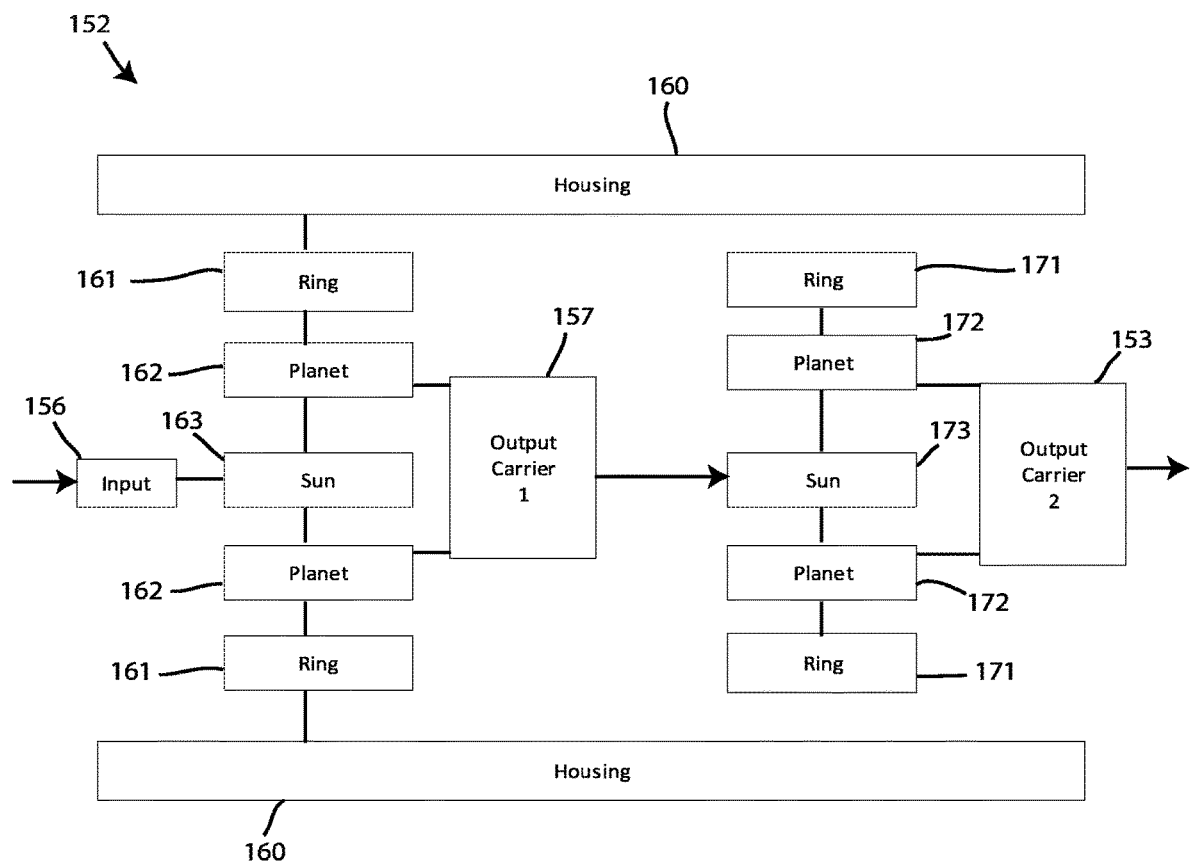
FIG. 5 depicts a schematic view of a two-stage solvent pump gearbox in accordance with one embodiment.

FIG. 5 depicts a schematic view of a two-stage solvent pump gearbox 152 in accordance with one embodiment. The two-stage solvent pump gearbox 152 may be similar to the gearbox 52 described hereinabove. However, the two-stage solvent pump gearbox 152 may include two separate planetary gear systems in succession rather than a single planetary gear system as shown in the gearbox 52. The two-stage solvent pump gearbox 152 is shown including a housing 160, a first ring gear 161, a first planetary gear system 162, and a first sun gear 163. The first planet gear system 162 includes a first plurality of separate planet gears. The first planet gear system 162 is meshed with and surrounding the first sun gear 163. The first planet gear system 162 is configured to rotate about the first sun gear 163. The first ring gear 161 is meshed with and surrounding the first planet gear system 162 such that the first planet gear system 162 is configured to rotate about the first ring gear 162. The first ring gear 161 is meshed with or otherwise attached to the housing 160. The housing 160 is a fixed housing, preventing movement of the first ring gear 162 when the first ring gear 162 is meshed with the housing 160.

In the embodiment shown, an input 156 is connected directly to the sun gear 163 to drive or rotate the sun gear 163. The ring gear 162 is fixed to the housing 160 and therefore does not rotate. Like the gearbox 52, the planet gear system 162 rotates about the sun gear 163, the input 56 is directly connected to the sun gear 63, and an output 157 is connected to the planetary gear system 62 with the ring gear 62 being fixed. Unlike the gearbox 52, the output 157 does not drive the pistons 54, 55, but rather acts as an input for the second planetary gear stage.

The second planetary gear stage is shown including a second ring gear 171, a second planetary gear system 172, and a second sun gear 173. The second planet gear system 172 includes a second plurality of separate planet gears. The second planet gear system 172 is meshed with and surrounding the second sun gear 173. The second planet gear system 172 is configured to rotate about the second sun gear 173. The second ring gear 171 is meshed with and surrounding the second planet gear system 172 such that the second planet gear system 172 is configured to rotate about the second ring gear 172. The second ring gear 171 is meshed with or otherwise attached to the housing 160. As shown, the output 153 is connected to the second planetary gear system 172. This output 153 may be the output provided to the pistons 54, 55.

The housing 160 is a fixed housing and the second ring gear 171 is shown to be disconnected from the housing 160. Each of the first ring gear 161 and the second ring gear 171 is configured to be selectively affixed to the housing 160.

The first and second ring gears 161, 171 may each be selectively and independently attached to the fixed housing 160 to prevent movement and fix the first and second ring gears 161, 171 in place. In this embodiment, the gearbox 162 may include four separate input to output ratios: one where both the first and second ring gears 161, 171 are affixed to the housing 160, one where both the first and second ring gears 161, 171 are allowed to freely rotate about the housing 160, one where the first ring gear 161 is fixed to the housing 160 but the second ring gear 171 is allowed to freely rotate about the housing 160, and one where the second ring gear 171 is fixed to the housing but the first ring gear 161 is allowed to freely rotate about the housing 160.

Figure 6:
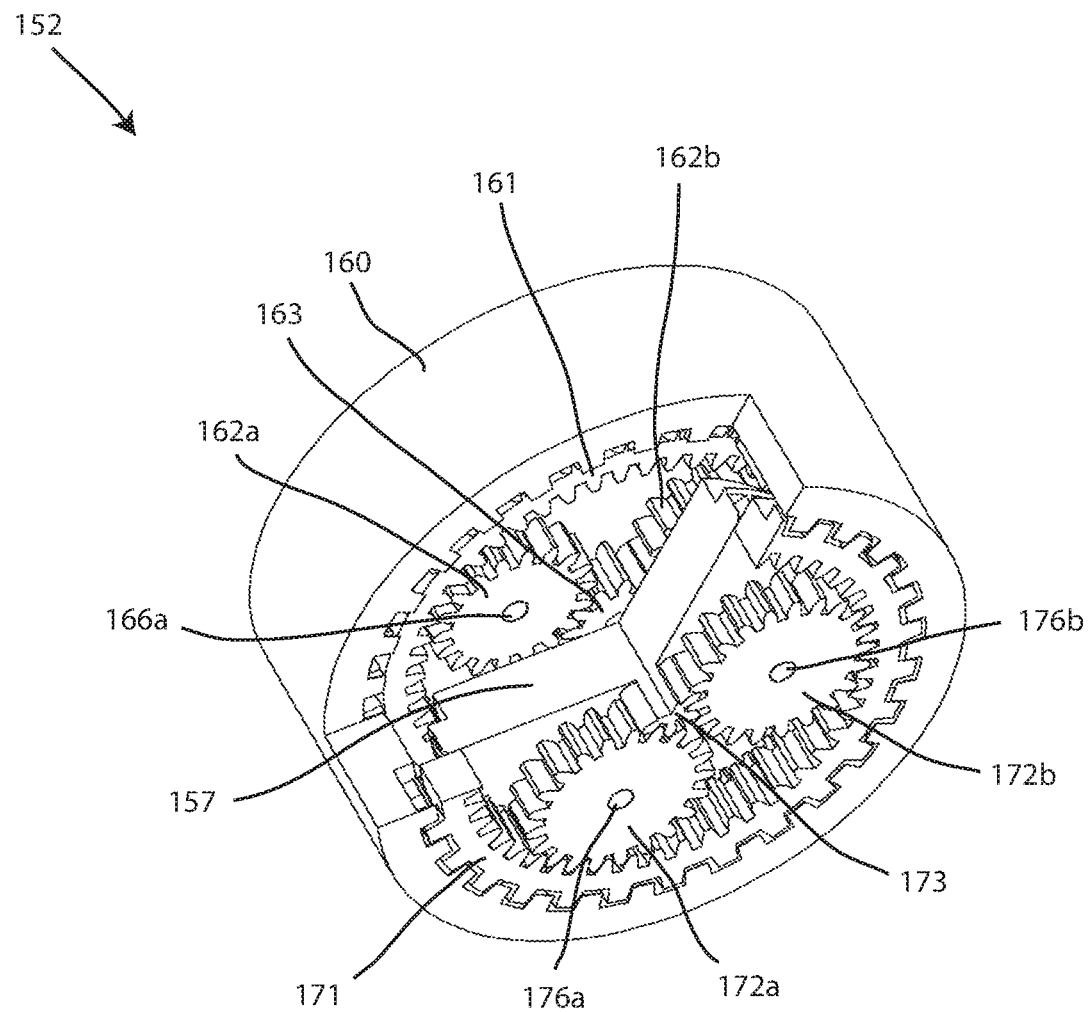
FIG. 6 depicts a cross sectional perspective view of the solvent pump gearbox of FIG. 5 with a ring gear engaged with a housing in accordance with one embodiment.

FIG. 6 depicts a cross sectional perspective view of the solvent pump gearbox 152 with the second ring gear 171 engaged with the housing 160 and the first ring gear 161 disengaged from the housing 160 in accordance with one embodiment. In this view, a portion of the second planetary gear stage removed to reveal the first planetary gear stage. While not shown, the first sun gear 163 of the first stage may include an interface that connects to the input 156 of the system and is driven from the motor. Because the first ring gear 161 is shown not meshed with the housing 160, the rotational output of the first set of planetary gears 162a, 162b to the second stage may be the same as the rotational input provided to the first sun gear 163 by the input 156. This is because the output of the first stage is shown engaged with the ring gear as described above and shown in FIG. 3B. The output 157 of the first stage is connected to the second sun gear 173 of the second stage. While not shown, the output 157 may include prongs configured to be received by the openings 166a of each of the planetary gears 162a, 162b. While FIG. 6 shows two planetary gears 162a, 162b in the first stage, the third planetary gear is hidden behind the output 157. The second planetary gear stage shown in FIG. 6 includes the second sun gear 173. While FIG. 6 shows two planetary gears 172a, 172b in the second stage, the third planetary gear is removed to expose the first stage of gears. The two planetary gears each include a corresponding center opening 176a 176b which may be connected to the output 153 which is provided to the pistons 54, 55. The second ring gear 171 is shown meshed with the inner teeth of the housing 160 to affix the second ring gear 171 thereto. Thus, the second stage of planetary gears will provide an input-to-output ratio that is not 1:1 but determined by the speed of the input rotation on the second sun gear 173 and the teeth of the second sun gear 173 and the second ring gear 171.

Figure 7:
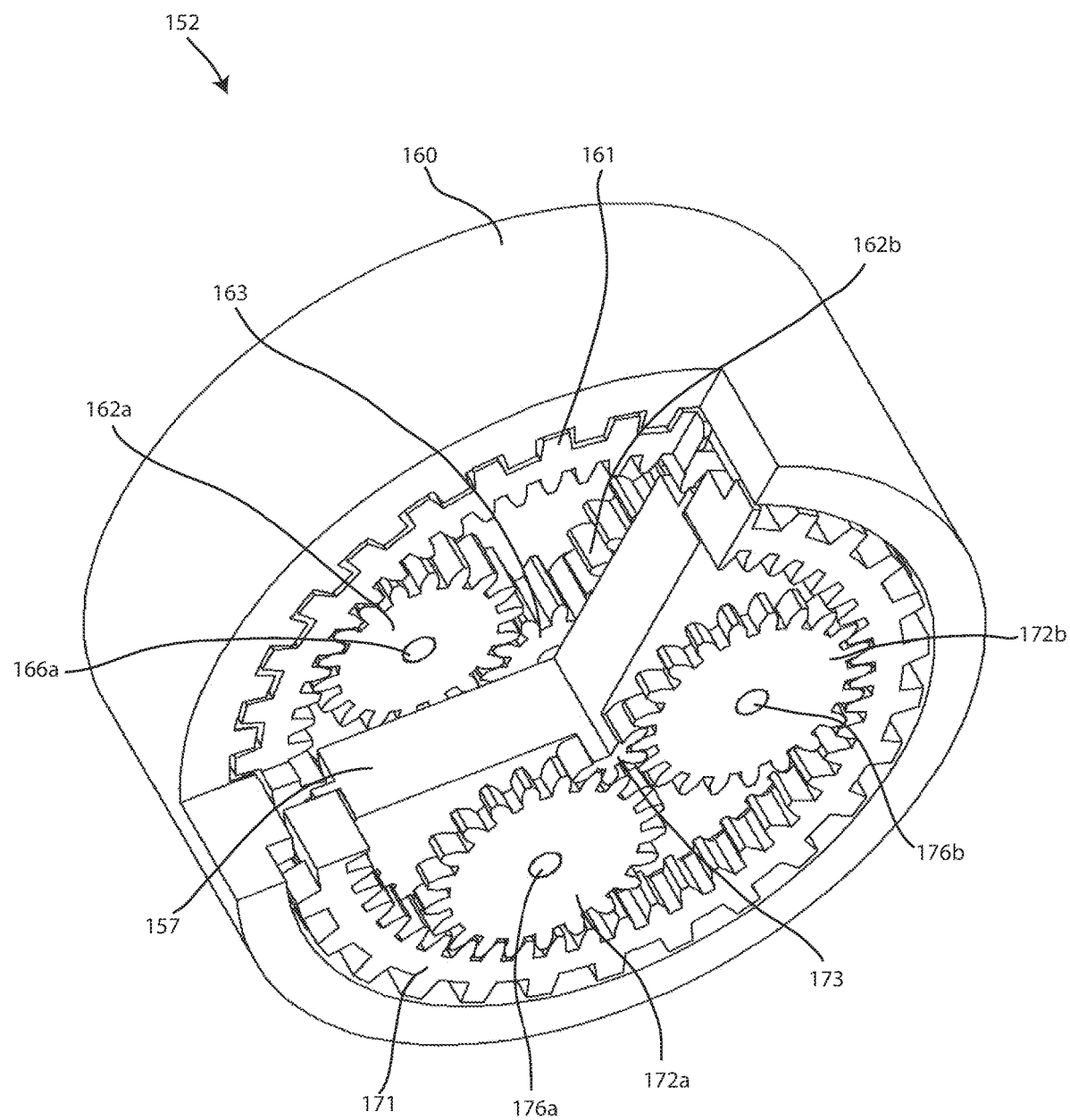
FIG. 7 depicts a cross sectional perspective view of the solvent pump gearbox of FIGS. 5 and 6 with the ring gear disengaged from the housing in accordance with one embodiment.

FIG. 7 depicts a cross sectional perspective view of the solvent pump gearbox 152 with the first ring gear 161 engaged with the housing 160 and the second ring gear 171 disengaged from the housing 160 in accordance with one embodiment. Like the previous FIG. 6, a portion of the second planetary gear stage removed to reveal the first planetary gear stage. Unlike FIG. 6, the first ring gear 161 is meshed with the housing 160. This embodiment shows a similar arrangement to the single stage shown in FIG. 3A. Thus, the rotational output of the first set of planetary gears 162a, 162b to the second stage is different from the rotational input provided to the first sun gear 163 by the input 156. The second ring gear 171 is shown free to rotate about the housing 160. Thus, the second stage of planetary gears will provide a 1:1 input-to-output ratio i.e. whatever rotation the output 157 provides will be the overall output 153 of the gearbox 152 in this configuration.

FIGS. 8A-8E depict various schematic views of solvent pump gearboxes that might be provided. With respect to these systems, various torque and speed properties may be achieved by connecting inputs and outputs to the various gear components of the planetary gear system or stage. While these variations are shown with respect to a single stage system, these variations are also applicable to multiple stage systems.

Figure 8A:
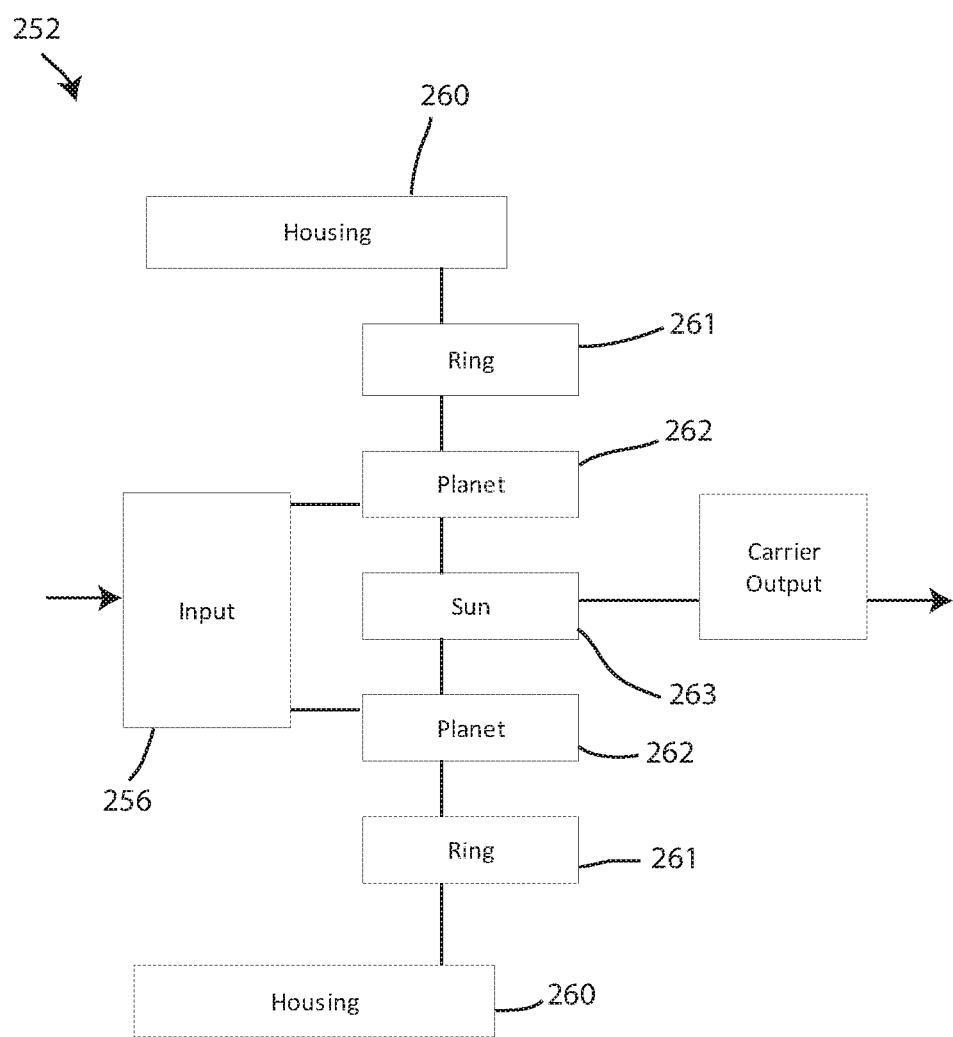
FIG. 8A depicts a schematic view of a solvent pump gearbox in accordance with one embodiment.

FIG. 8A depicts a schematic view of a solvent pump gearbox 252 in accordance with one embodiment. The solvent pump gearbox 252 includes a housing 260, a ring gear 261, a planet gear system 262, and a sun gear 263. An input 256 provides a rotary motion input to the planetary gear system and an output 253 carries a rotary motion output to the pistons of the pump system (not shown). The solvent pump gearbox 252 may replace the solvent pump gearbox 52 described herein above and incorporated into the pumping system 20 and any type of appropriate or desired liquid chromatography system.

Unlike the gearbox 52, the input 256 of the solvent pump gearbox 252 is attached or otherwise integrated into the planetary gear system 262, which may include a plurality of separate planetary gears. The ring gear 261 is removably fixed to the housing when the system is configured to provide for a change in input-to-output gear ratio. The sun gear 263 is rotated by the planetary gear system 262 to produce the output 253 to the pistons. This embodiment may be particularly beneficial if output speed is to be maximized and the max output torque is to be minimized.

Figure 8B:
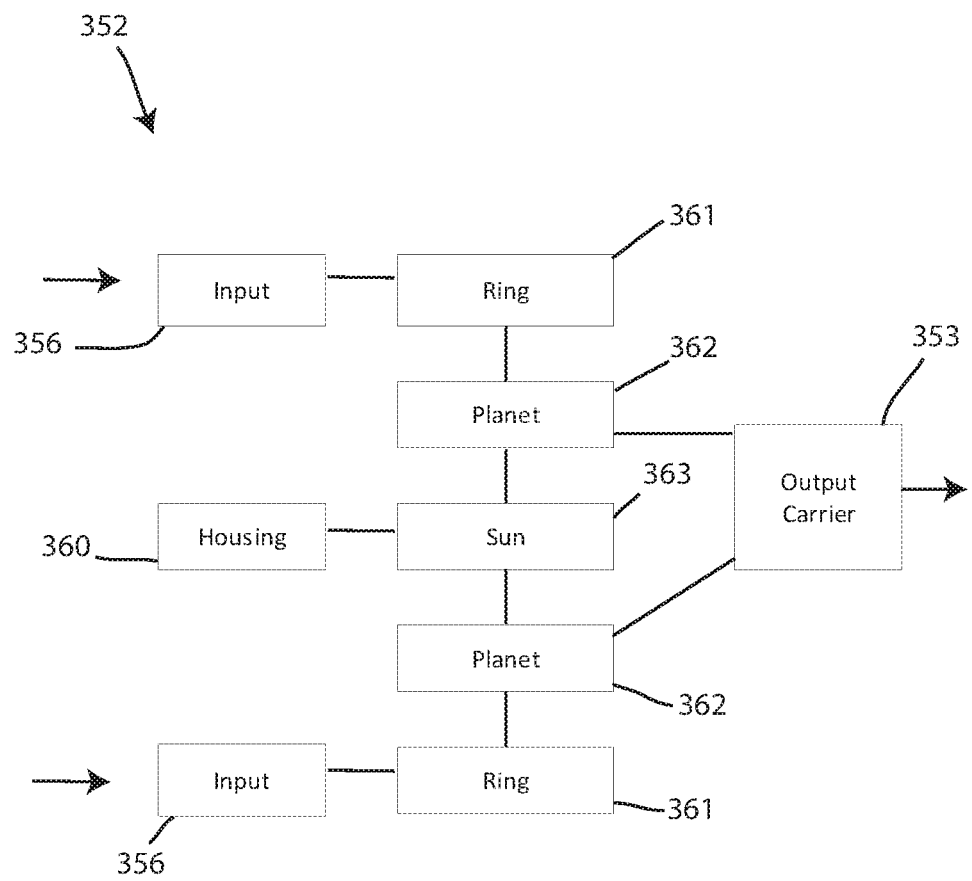
FIG. 8B depicts a schematic view of a solvent pump gearbox in accordance with one embodiment.

FIG. 8B depicts a schematic view of a solvent pump gearbox 352 in accordance with one embodiment. The solvent pump gearbox 352 includes a housing 360, a ring gear 361, a planet gear system 362, and a sun gear 363. An input 356 provides a rotary motion input to the planetary gear system and an output 353 carries a rotary motion output to the pistons of the pump system (not shown). The solvent pump gearbox 352 may replace the solvent pump gearbox 52 described herein above and incorporated into the pumping system 20 and any type of appropriate or desired liquid chromatography system.

This embodiment shows the input 356 and output 353 attached to different features of the planetary gear system. In particular, the input 356 in this embodiment is attached to the outer ring gear 361, which is configured to rotate. The sun gear 363 is removably fixed the housing 360. The planet gear system 362 is configured to rotate between the fixed sun gear 363 and the rotating outer ring gear 361 to produce the output 353 to the pistons. This embodiment may be particularly beneficial if minimum torque is desired to be high and minimum output speed is desired to be low.

Figure 8C:
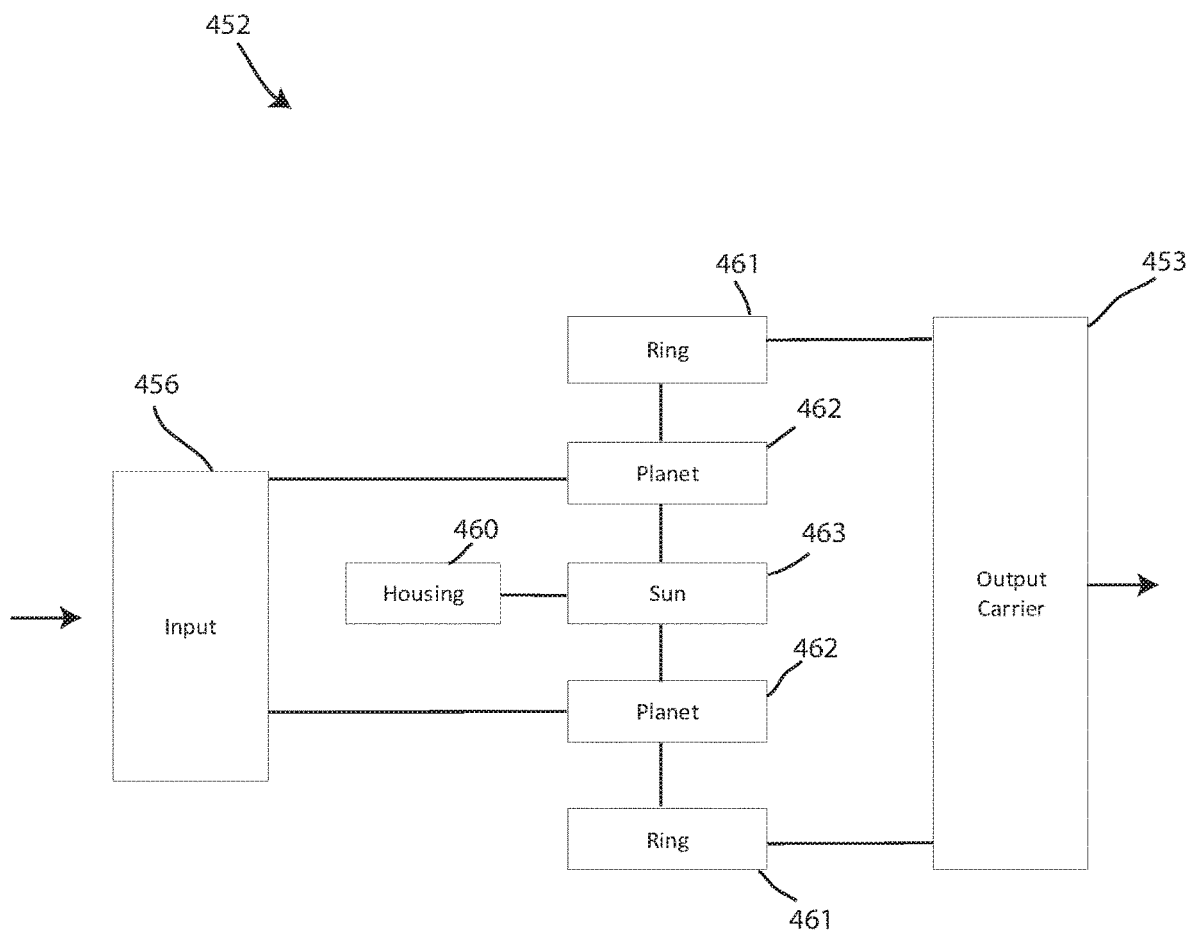
FIG. 8C depicts a schematic view of a solvent pump gearbox in accordance with one embodiment.

FIG. 8C depicts a schematic view of a solvent pump gearbox 452 in accordance with one embodiment. The solvent pump gearbox 452 includes a housing 460, a ring gear 461, a planet gear system 462, and a sun gear 463. An input 456 provides a rotary motion input to the planetary gear system and an output 453 carries a rotary motion output to the pistons of the pump system (not shown). The solvent pump gearbox 452 may replace the solvent pump gearbox 52 described herein above and incorporated into the pumping system 20 and any type of appropriate or desired liquid chromatography system.

This embodiment also shows the input 456 and output 453 attached to different features of the planetary gear system. In particular, the input 456 in this embodiment is attached to the planet gear system 462, which is configured to rotate. The sun gear 463 is removably fixed the housing 460. The ring gear 461 is configured to rotate to produce the output 453 to the pistons. This embodiment may be particularly beneficial if minimum speed is desired to be high and minimum torque is desired to be low.

Figure 8D:
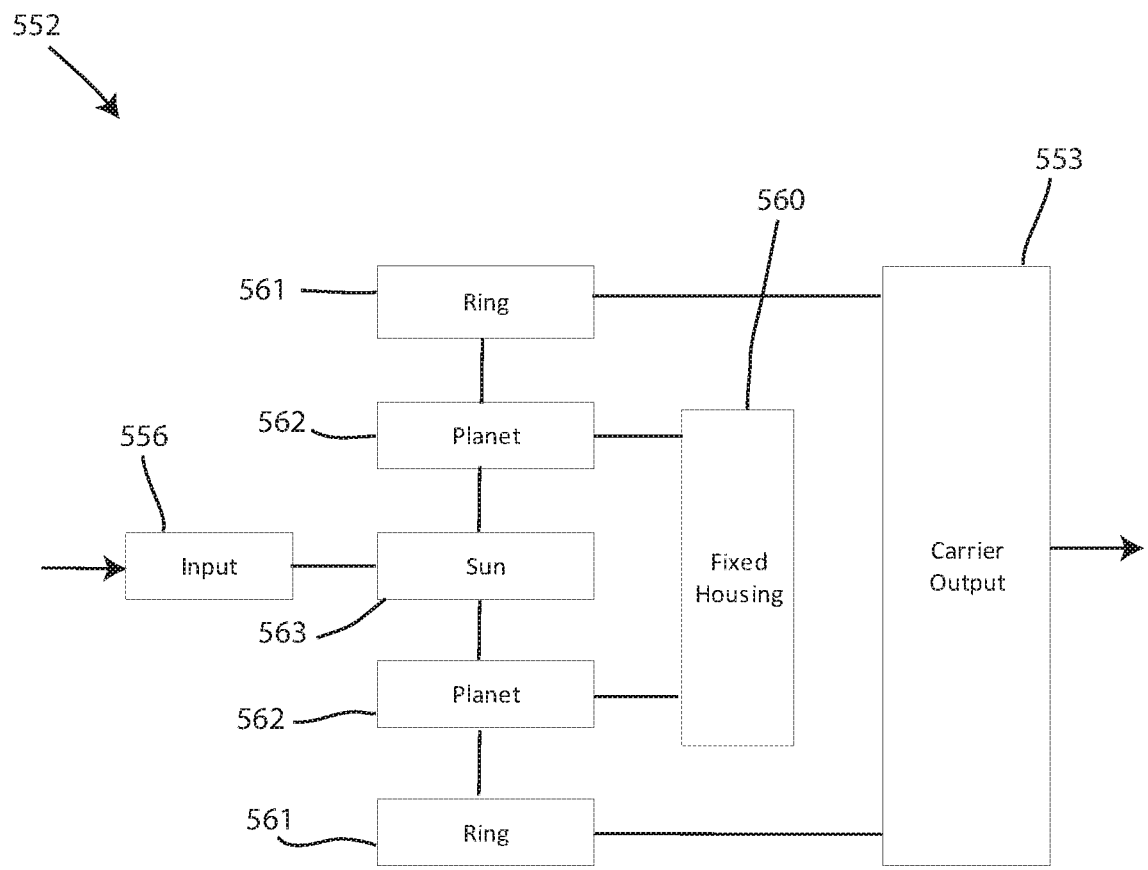
FIG. 8D depicts a schematic view of a solvent pump gearbox in accordance with one embodiment.

FIG. 8D depicts a schematic view of a solvent pump gearbox 552 in accordance with one embodiment. The solvent pump gearbox 552 includes a housing 560, a ring gear 561, a planet gear system 562, and a sun gear 563. An input 556 provides a rotary motion input to the planetary gear system and an output 553 carries a rotary motion output to the pistons of the pump system (not shown). The solvent pump gearbox 552 may replace the solvent pump gearbox 52 described herein above and incorporated into the pumping system 20 and any type of appropriate or desired liquid chromatography system.

This embodiment also shows the input 556 and output 553 attached to different features of the planetary gear system. In particular, the input 556 in this embodiment is attached to the sun gear 563, which is configured to rotate. The planetary gear system 562 is removably fixed to a housing 560. In this embodiment, the housing 560 may be configured to allow the planet gears of the planet gear system 562 to spin or rotate freely on a fixed and immovable axis. Thus, the housing 560 may prevent the rotation of the planet gears of the planet gear system 562 about the sun gear 563. In this embodiment, the ring gear 561 is configured to rotate to produce the output 553 to the pistons. This embodiment may be particularly beneficial for low speed and high torque operating requirements.

Figure 8E:
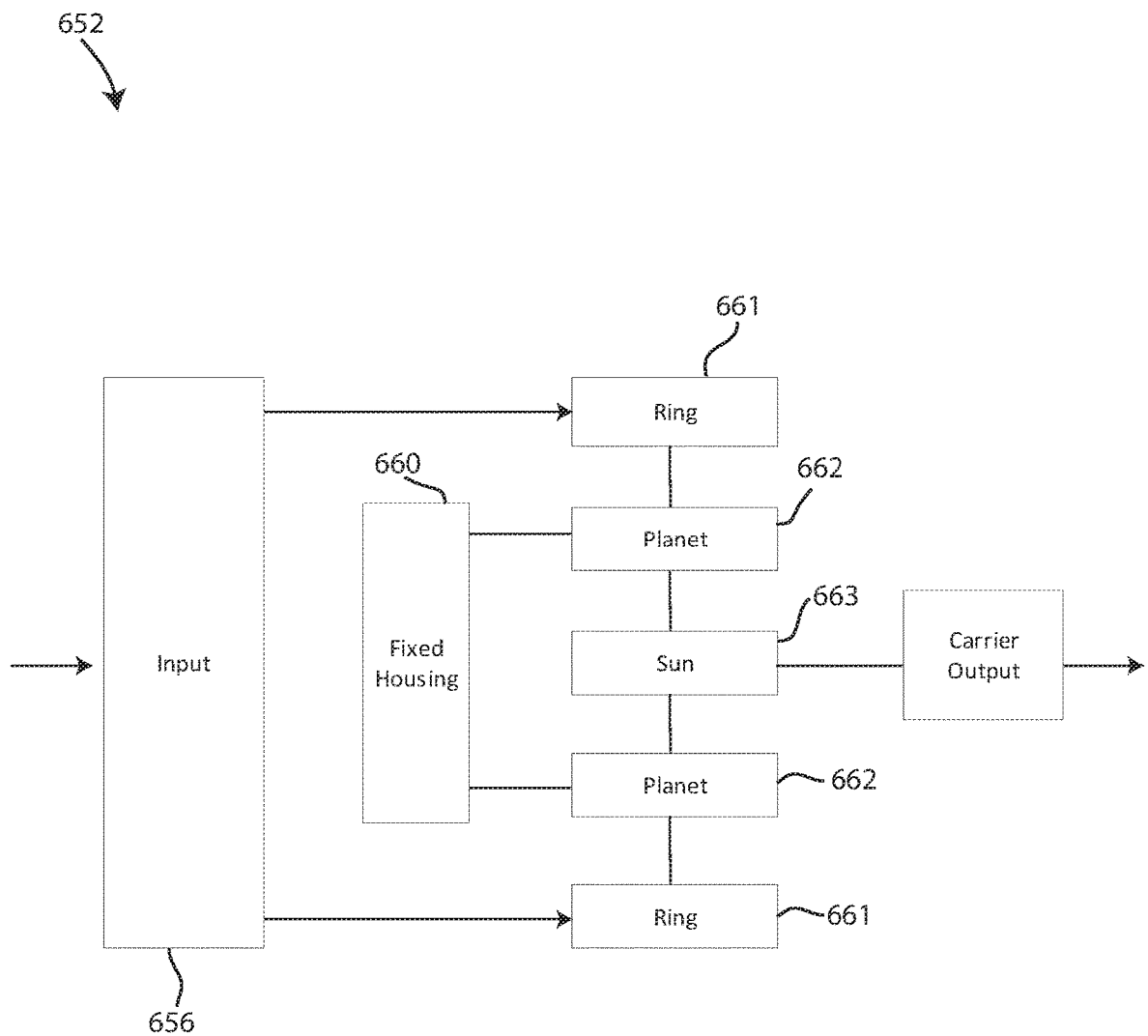
FIG. 8E depicts a schematic view of a solvent pump gearbox in accordance with one embodiment.

FIG. 8E depicts a schematic view of a solvent pump gearbox 652 in accordance with one embodiment. The solvent pump gearbox 652 includes a housing 660, a ring gear 661, a planet gear system 662, and a sun gear 663. An input 656 provides a rotary motion input to the planetary gear system and an output 653 carries a rotary motion output to the pistons of the pump system (not shown). The solvent pump gearbox 652 may replace the solvent pump gearbox 52 described herein above and incorporated into the pumping system 20 and any type of appropriate or desired liquid chromatography system.

This embodiment also shows the input 656 and output 653 attached to different features of the planetary gear system. In particular, the input 656 in this embodiment is attached to the ring gear 661, which is configured to rotate. The planetary gear system 662 is removably fixed to a housing 660. In this embodiment, the housing 660 may be configured to allow the planet gears of the planet gear system 662 to spin or rotate freely on a fixed and immovable axis. Thus, the housing 660 may prevent the rotation of the planet gears of the planet gear system 662 about the sun gear 663. In this embodiment, the sun gear 663 is configured to rotate to produce the output 653 to the pistons. This embodiment may be particularly beneficial for high speed and low torque operating requirements.

While the above schematic embodiments shown in FIG. 8A-8E depict single stage systems, embodiments of the present invention may be applied to gearboxes having two stages, three stages, four stages, five stages, six stages or the like. The larger the number of stages, the more possible input-to-output gear ratios may be provided by the gearbox. This may be particularly advantageous if, for example, a motor is used having a small optimum output range that needs to be running very close to the same speed to maintain resolution, precision or efficiency.

Further contemplated are methods of pumping solvent in a liquid chromatography system, such as the liquid chromatography system 10, using a pumping system, such as the pumping system 20. In one embodiment, a method of pumping solvent in a liquid chromatography system may include providing a liquid chromatography solvent pump comprising a variable output drive system, such as the variable output drive system 51, coupling a motor, such as the motor 50, and at least one piston, such as the pistons 54, 55. The variable output drive system may include a gearbox, such as the gearbox 52, configured to provide a non-equal ratio between an input, such as the input 56, from the motor and an output, such as the output 53, delivered to the at least one piston. The method may include varying the output from an equal ratio to the non-equal ratio between the input from the motor and the output delivered to the at least one piston. The method may further include delivering a flow of solvent in a liquid chromatography system by the at least one piston with a flow rate determined at least partially by the output. The method may include using the liquid chromatography solvent pump in an analytical liquid chromatography system and in a preparative liquid chromatography system. The method may include providing a first stage of planetary gears in the gearbox. The method may include providing, by the motor, an input to a sun gear of first stage of planetary gears, such as the sun gear 63, 163. The method may include providing an output by a carrier, such as one of the outputs 53, 153, 157, by a plurality of planet gears, such as one of the planet gear system 62, 162, 172.

The method may include engaging a ring gear, such as the ring gear 61, 161, 171 with a fixed housing, such as the housing 60, 160, to prevent rotation of the ring gear such that a first ratio exists between the input from the motor and the output delivered to the at least one piston. The method may include disengaging the ring gear with the fixed housing to provide for free rotation of the ring gear about the fixed housing such that a second ratio exists between the input from the motor and the output delivered to the at least one piston. The method may include providing a second stage of planetary gears in the gearbox. The method may include providing an input, by a second carrier, such as the output 157, to a second sun gear, such as the second sun gear 173. The method may include providing an output, by the second carrier, to a piston or to a third sun gear of a third stage of gears. The method may include selectively and independently engaging, with the fixed housing, the ring gear and the second ring gear to selectively and independently prevent rotation of the ring gear and the second ring gear. The method may further include selectively and independently disengaging, with the fixed housing, the ring gear and the second ring gear to selectively and independently allow free rotation of the ring gear and the second ring gear about the fixed housing.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A liquid chromatography solvent pump comprising:
   a motor;
   a first piston;
   a second piston;
   a variable output drive system coupling the motor to at least one of the first piston and the second piston, the variable output drive system comprising a gearbox configured to provide a non-equal ratio between an input from the motor and an output delivered to at least one of the first piston and the second piston, wherein the gearbox comprises a planetary gear system,
   wherein the first piston and the second piston are configured to deliver a flow of solvent in a liquid chromatography system.

2. The liquid chromatography solvent pump of claim 1, wherein the first piston is a primary piston and the second piston is an accumulator piston.

3. The liquid chromatography solvent pump of claim 1, wherein the gearbox includes a stage of gears comprising:
   a sun gear;
   a plurality of planet gears meshed with and surrounding the sun gear and configured to revolve around the sun gear; and
   a ring gear meshed with and surrounding the plurality of planet gears, wherein the plurality of planet gears are configured to revolve within the ring gear.

4. The liquid chromatography solvent pump of claim 3, further comprising a carrier connecting the plurality of planet gears, wherein the motor provides an input to the sun gear, wherein the carrier comprises an output from the plurality of planet gears.

5. The liquid chromatography solvent pump of claim 4, wherein the carrier provides the output to at least one of the first piston and the second piston.

6. The liquid chromatography solvent pump of claim 4, wherein the gearbox further comprises:
   a fixed housing configured to engage with the ring gear to prevent rotation of the ring gear, wherein the ring gear is configured to disengage from the fixed housing to provide for free rotation of the ring gear about the fixed housing.

7. The liquid chromatography solvent pump of claim 4, further comprising a second stage of gears, the second stage of gears comprising:
   a second sun gear;
   a second plurality of planet gears meshed with and surrounding the second sun gear and configured to revolve around the second sun gear;
   a second ring gear meshed with and surrounding the second plurality of planet gears, wherein the second plurality of planet gears are configured to revolve within the second ring gear; and
   a second carrier connecting the second plurality of planet gears, wherein the carrier provides an input to the second sun gear; and wherein the second carrier provides an output to at least one of the first piston, the second piston, and a third sun gear of a third stage of gears.

8. The liquid chromatography solvent pump of claim 7, further comprising a fixed housing configured to engage with the ring gear and the second ring gear to selectively and independently prevent rotation of the ring gear and the second ring gear, wherein the ring gear and the second ring gear are each configured to selectively and independently disengage from the fixed housing to provide for selective free rotation of the ring gear and the second ring gear about the fixed housing.

9. The liquid chromatography solvent pump of claim 1, wherein the variable output drive system, the first piston and the second piston are configured to deliver the flow at a rate and accuracy that enables use of the liquid chromatography solvent pump in both analytical and preparative liquid chromatography systems.

10. The liquid chromatography solvent pump of claim 1, wherein the gearbox is configured to provide an equal ratio between an input from the motor and an output delivered to at least one of the first piston and the second piston, and wherein the equal ratio and the non-equal ratio are selectable by an operator of the liquid chromatography solvent pump.

11. A method of pumping solvent in a liquid chromatography system, the method comprising:
    providing a liquid chromatography solvent pump comprising a variable output drive system coupling a motor and at least one piston, the variable output drive system comprising a gearbox configured to provide a non-equal ratio between an input from the motor and an output delivered to the at least one piston, wherein the gearbox comprises a planetary gear system; and
    varying the output from an equal ratio to the non-equal ratio between the input from the motor and the output delivered to the at least one piston.

12. The method of claim 11, further comprising delivering a flow of solvent in a liquid chromatography system by the at least one piston with a flow rate determined at least partially by the output.

13. The method of claim 11, further comprising:
    using the liquid chromatography solvent pump in an analytical liquid chromatography system; and
    using the liquid chromatography solvent pump in a preparative liquid chromatography system.

14. The method of claim 11, wherein the gearbox includes a stage of gears comprising:
    a sun gear;
    a plurality of planet gears meshed with and surrounding the sun gear and configured to revolve around the sun gear;
    a ring gear meshed with and surrounding the plurality of planet gears, wherein the plurality of planet gears are configured to revolve within the ring gear;
    a carrier connecting the plurality of planet gears; and
    a fixed housing,
    the method further comprising:
      providing, by the motor, an input to the sun gear; and
      providing, by the carrier, an output by the plurality of planet gears.

15. The method of claim 14, further comprising engaging the ring gear with the fixed housing to prevent rotation of the ring gear such that a first ratio exists between the input from the motor and the output delivered to the at least one piston.

16. The method of claim 15, further comprising disengaging the ring gear with the fixed housing to provide for free rotation of the ring gear about the fixed housing such that a second ratio exists between the input from the motor and the output delivered to the at least one piston.

17. The method of claim 14, wherein the gearbox further includes a second stage of gears, the second stage of gears comprising:
    a second sun gear;
    a second plurality of planet gears meshed with and surrounding the second sun gear and configured to revolve around the second sun gear;

a second ring gear meshed with and surrounding the second plurality of planet gears, wherein the second plurality of planet gears are configured to revolve within the second ring gear; and a second carrier connecting the second plurality of planet gears, the method further comprising:
    providing, by the carrier, an input to the second sun gear; and
    providing, by the second carrier, an output to at least one of the first piston, the second piston, and a third sun gear of a third stage of gears.

18. The method of claim 17, further comprising selectively and independently engaging, with the fixed housing, the ring gear and the second ring gear to selectively and independently prevent rotation of the ring gear and the second ring gear.

19. The method of claim 18, further comprising selectively and independently disengaging, with the fixed housing, the ring gear and the second ring gear to selectively and independently allow free rotation of the ring gear and the second ring gear about the fixed housing.

20. A liquid chromatography system comprising:
a solvent delivery system, including a pump, the pump including a motor, a first piston, and a second piston; and
a variable output drive system coupling the motor to at least one of the first piston and the second piston, the variable output drive system comprising a gearbox configured to provide a non-equal ratio between an input from the motor and an output delivered to at least one of the first piston and the second piston, wherein the gearbox comprises a planetary gear system,
    wherein the first piston and the second piston are configured to deliver a flow of solvent in the liquid chromatography system;
    a sample delivery system in fluidic communication with solvent delivery system;
    a liquid chromatography column located downstream from the solvent delivery system and the sample delivery system; and
    a detector located downstream from the liquid chromatography column.

* * * * *

UNITED STATES PATENT AND TRADEMARK OFFICE
CERTIFICATE OF CORRECTION

PATENT NO. : 11,162,517 B2
APPLICATION NO. : 16/573311
DATED : November 2, 2021
INVENTOR(S) : Jeffrey Musacchio and Joseph Michienzi It is certified that error appears in the above-identified patent and that said Letters Patent is hereby corrected as shown below:

In the Claims

Column 16, Line 12 (Claim 10):
In the sentence "between an input from the motor and an output delivered to", delete both occurrences of the word "an" and insert --the-- before the word "input" and the word "output".

Column 16, Line 29 (Claim 12):
In the phrase "solvent in a liquid chromatography system", delete "a" before "liquid" and insert --the-- in its place.

Signed and Sealed this
Twentieth Day of September, 2022

Katherine Kelly Vidal
*Director of the United States Patent and Trademark Office*